United States Patent
Kubota (10) Patent No.: US 9,797,468 B2
(45) Date of Patent: Oct. 24, 2017

(54) LIQUID SEALED MOUNT

(71) Applicant: YAMASHITA RUBBER KABUSHIKI KAISHA, Fujimino-shi, Saitama (JP)

(72) Inventor: Yousuke Kubota, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/901,844

(22) PCT Filed: Aug. 13, 2014

(86) PCT No.: PCT/JP2014/071414
§ 371 (c)(1),
(2) Date: Dec. 29, 2015

(87) PCT Pub. No.: WO2015/022984
PCT Pub. Date: Feb. 19, 2015

(65) Prior Publication Data
US 2016/0369864 A1     Dec. 22, 2016

(30) Foreign Application Priority Data
Aug. 14, 2013  (JP) .................................. 2013-168738

(51) Int. Cl.
*F16F 13/10*  (2006.01)
*F16F 13/06*  (2006.01)
(Continued)

(52) U.S. Cl.
CPC ............ *F16F 13/10* (2013.01); *B60K 5/1208* (2013.01); *F16F 13/06* (2013.01); *F16F 13/105* (2013.01); *F16F 13/18* (2013.01); *F16F 2230/30* (2013.01)

(58) Field of Classification Search
CPC .......... F16F 13/10; F16F 13/06; F16F 13/105; F16F 13/18; F16F 2230/30; B60K 5/1208
(Continued)

(56) References Cited

U.S. PATENT DOCUMENTS 5,259,598 A *  11/1993  Hibi ........................ F16F 13/22
                                              267/140.13
5,501,433 A *  3/1996  Satori ................... F16F 13/106
                                              248/636
(Continued)

FOREIGN PATENT DOCUMENTS

DE    199 30 726        1/2001
JP    63-166738         10/1988
(Continued)

OTHER PUBLICATIONS

International Search Report dated Sep. 9, 2014, Application No. PCT/JP2014/071414.
(Continued)

*Primary Examiner* — Thomas J Williams
*Assistant Examiner* — Mariano Sy
(74) *Attorney, Agent, or Firm* — Rankin, Hill & Clark LLP (57) ABSTRACT

In liquid, an elastic main body member, a partition member, and a diaphragm are inserted into an outer cylinder one by one, and the diaphragm is held down by a fixing ring and fixed by a claw. Then, the liquid adheres onto outer circumferential surfaces of the partition member and the diaphragm. Therefore, a first special seal for adhered liquid is provided in an elastic partition member of the partition member and also a second special seal for adhered liquid and a third special seal for adhered liquid are provided in the diaphragm, so as to provide a seal between each of the outer circumferential surfaces of the partition member and the
(Continued)

diaphragm and the fixing ring, so that the adhered liquid is prevented from leaking outwardly as leaked liquid.

14 Claims, 12 Drawing Sheets

(51) Int. Cl.
*F16F 13/18* (2006.01)
*B60K 5/12* (2006.01)

(58) Field of Classification Search
USPC .......................... 267/140.13, 140.11, 140.12
See application file for complete search history.

(56) References Cited

U.S. PATENT DOCUMENTS

| | | | | |
|---|---|---|---|---|
| 5,667,205 A * | 9/1997 | Mutoh | ............ | F16F 13/26 267/140.13 |
| 6,267,362 B1 * | 7/2001 | Satori | ............ | F16F 13/103 267/140.13 |
| 6,357,731 B1 * | 3/2002 | Tanahashi | ............ | F16F 13/10 267/140.13 |
| 8,651,468 B2 * | 2/2014 | Matsuda | ............ | F16F 1/373 267/140.13 |
| 2001/0019099 A1 * | 9/2001 | Okanaka | ............ | F16F 13/105 248/562 |
| 2003/0205856 A1 * | 11/2003 | Hibi | ............ | F16F 13/105 267/140.13 |
| 2007/0057421 A1 * | 3/2007 | Nanno | ............ | F16F 13/105 267/140.13 |
| 2007/0176339 A1 * | 8/2007 | Minamisawa | ............ | B60K 5/1208 267/140.13 |
| 2007/0216075 A1 * | 9/2007 | Ogawa | ............ | F16F 13/10 267/140.12 |

FOREIGN PATENT DOCUMENTS

| | | | |
|---|---|---|---|
| JP | 05272582 A | * | 10/1993 |
| JP | 10-227328 | | 8/1998 |
| JP | 2000-257665 | | 9/2000 |
| JP | 2001-234968 | | 8/2001 |
| JP | 2005-172202 | | 6/2005 |
| WO | 2008/069131 | | 6/2008 |

OTHER PUBLICATIONS

International Search Report dated Sep. 9, 2014, Application No. PCT/JP2014/071414, 4 pages.

* cited by examiner

LIQUID SEALED MOUNT

TECHNICAL FIELD

The present invention relates to a liquid sealed mount for use with an engine mount or the like, and more particularly, to an adhered liquid leak preventing structure for preventing the adhered liquid during assembly from leaking out to a product surface.

BACKGROUND ART

The liquid sealed mount includes an elastic main body member forming at least a part of a liquid chamber, a diaphragm covering an opening on the side of the liquid chamber, and a partition member partitioning the liquid chamber into multiple liquid chambers, and is configured to realize high damping and low dynamic spring by producing liquid column resonance by an orifice passage which communicates between the multiple liquid chambers.

At the time when assembling this liquid sealed mount, in an assembly method of piling up type, the elastic main body member, the partition member and the diaphragm are inserted in the liquid one by one into a cylindrical outer cylinder, and the diaphragm is fixed by the outer cylinder, so that all component members are assembled and integrated.

Further, in another assembly method, the partition member, the diaphragm and the outer cylinder are integrally combined outside the liquid, and then, this combined unit and the elastic main body member are integrally assembled, in the liquid (see a patent reference 1).

PRIOR ART REFERENCE

Patent reference 1: Japanese Patent Application Laid-Open Publication No. H10-227328.

DISCLOSURE OF THE INVENTION

Problem to be Solved by the Invention

By the way, when being assembled in the liquid as above, the liquid adheres on outer circumferential portions of the partition member and the diaphragm. This adhered liquid is trapped in joining surfaces between each of the partition member and the diaphragm and the outer cylinder which covers outer circumferences of the partition member and the diaphragm, and, after being assembled, there may be cases where the liquid leaks out onto a product surface.

This leaked liquid itself is not hydraulic liquid which has leaked from the liquid chamber, and results from the adhered liquid. Therefore, even if the liquid has leaked out, there is no problem on performance of the liquid sealed mount at all. However, in a condition where the liquid has leaked out, it is not possible to judge whether the liquid is due to the adhered liquid or the leaked liquid from the liquid chamber, so that it is required to perform an accurate liquid leak inspection for checking the quality of the product.

Accordingly, it is desirable that a special seal for the adhered liquid which prevents the leak of the adhered liquid so as not to produce the liquid leak due to the adhered liquid is provided for dispensing with the above indicated liquid leak inspection and also for obtaining the high quality product in external appearance.

Means for Solving the Problem

In order to solve the above subject, a liquid sealed mount according to a first feature of the present invention comprises an elastic main body member (30), a diaphragm (50), a liquid chamber formed between the elastic main body member (30) and the diaphragm (50), a partition member (40) for partitioning the liquid chamber into a primary liquid chamber (38) and a secondary liquid chamber (52), an orifice passage (48) providing communication between the primary liquid chamber (38) and the secondary liquid chamber (52), and a special seal (75, 76) for adhered liquid providing a seal between each of the partition member (40) and the diaphragm (50) and a member (60) which covers each exterior of the partition member (40) and the diaphragm (50), so as to prevent the adhered liquid which is adhered on the partition member (40) and the diaphragm (50) at the time of assembly from leaking out, wherein the special seal (75, 76) for adhered liquid is provided at least in the diaphragm (50).

According to a second feature of the present invention, in addition to the first feature, a first special seal (71) for adhered liquid which forms one of the special seal for adhered liquid is provided in the partition member (40).

According to a third feature of the present invention, in addition to the second feature, the partition member (40) includes an elastic partition member (44) of an elastic member, and the first special seal (71) for adhered liquid is integrally provided on an outer circumferential wall (44e) of the elastic partition member (44).

According to a fourth feature of the present invention, in addition to any one of the first through third features, the special seal for adhered liquid includes a radially outwardly projecting member (71, 75).

According to a fifth feature of the present invention, in addition to any one of the first through fourth features, the diaphragm (50) includes a thick outer circumference fixing section (54) supported by an outer cylinder (20) in which the elastic main body member (30) is housed or a member (60) which is integrally combined with an inside of the outer cylinder (20), and a second special seal (75) for adhered liquid which forms one of the special seal for adhered liquid is integrally provided in the thick outer circumference fixing section (54).

According to a sixth feature of the present invention, in addition to the fifth feature, the thick outer circumference fixing section (54) is integrally formed with a third special seal (76) for adhered liquid which projects in the direction of a center axis so as to form one of the special seal for adhered liquid.

According to a seventh feature of the present invention, in addition to the fifth or sixth feature, the member integrally combined with the inside of the outer cylinder (20) is a fixing ring (60) configured to be inserted into the inside of the outer cylinder (20), wherein the thick outer circumference fixing section (54) is supported on a part of the fixing ring (60) in contacting relation, and the special seal for adhered liquid is configured to provide a seal between each of the partition member (40) and the thick outer circumference fixing section (54) and the fixing ring (60).

According to an eighth feature of the present invention, in addition to the seventh feature, the fixing ring (60) is fixed by a claw (28) of the outer cylinder (20).

Effects of the Invention

According to the first feature of the present invention, the special seal (71, 75, 76) for adhered liquid which provides a seal between each outer circumferential part of the partition member and the diaphragm and the covering member which covers each exterior of the partition member and the diaphragm, so as to prevent the adhered liquid from leaking out, is provided at least in the partition member and the diaphragm (50). Therefore, even if the adhered liquid adheres onto outer circumferential surfaces of the partition member and the diaphragm at the time of assembly in the liquid, the leak of the adhered liquid can be prevented by the special seal for adhered liquid. As a result, since there is no appearance of the leaked liquid after assembly, the quality in external appearance is greatly improved. In addition, the special seal for adhered liquid can be formed easily by utilizing the elasticity of the diaphragm.

According to the second feature of the present invention, since the first special seal (71) for adhered liquid which forms one of the special seal for adhered liquid is provided in the partition member (40), the liquid adhered on the outer circumferential part of the partition member (40) can be sealed more accurately.

According to the third feature of the present invention, the first special seal (71) for adhered liquid can be integrally provided on the outer circumferential wall of the elastic partition member (44) by utilizing the elasticity of the elastic partition member (44) which constitutes the partition member.

According to the fourth feature of the present invention, the special seal for adhered liquid includes the radially outwardly projecting member (71, 75). Therefore, even if the partition member and the diaphragm has moved in the direction orthogonal to the center axis, the special seal for adhered liquid which projects radially outwardly keeps sealing contact in the radial direction with the member (60) which covers the outer circumferential parts of the partition member and the diaphragm, whereby it is possible to maintain sealing performance.

According to the fifth feature of the present invention, since the second special seal (75) for adhered liquid is integrally provided in the thick outer circumference fixing section (54) of the diaphragm, the second special seal (75) for adhered liquid can be easily formed by utilizing an elastic thick-wall portion of the thick outer circumference fixing section (54).

According to the sixth feature of the present invention, since the thick outer circumference fixing section (54) is integrally formed with the third special seal (76) for adhered liquid which projects in the direction of the center axis, it is possible to provide a seal between the thick outer circumference fixing section (54) and the supporting member thereof in the direction of the center axis, whereby the adhered liquid can be sealed more accurately. In addition, the third special seal (76) for adhered liquid can be formed easily by utilizing the elasticity of the diaphragm.

According to the seventh feature of the present invention, the thick outer circumference fixing section (54) is supported on the part (64) of the fixing ring (60) in contacting relation, and the special seal for adhered liquid is configured to provide a seal between each of the partition member (40) and the thick outer circumference fixing section (54) and the fixing ring (60). Therefore, even in the case where the diaphragm is supported by fixing the thick outer circumference fixing section (54) by the fixing ring (60), the leak of the adhered liquid between the fixing ring (60) and the diaphragm can be prevented and sealed.

According to the eighth feature of the present invention, the fixing ring (60) is fixed by the claw (28) of the outer cylinder (20). Therefore, the fixation can be carried out accurately without an increase in size and weight of the diaphragm in comparison with the case where a mounting member is formed integral with the circumference of the diaphragm. In addition, a pull-out load of the elastic main body member (30), the partition member (40) and the diaphragm (50) can be increased whereby to improve reliability.

BEST MODE FOR CARRYING OUT THE INVENTION

Figure 1:
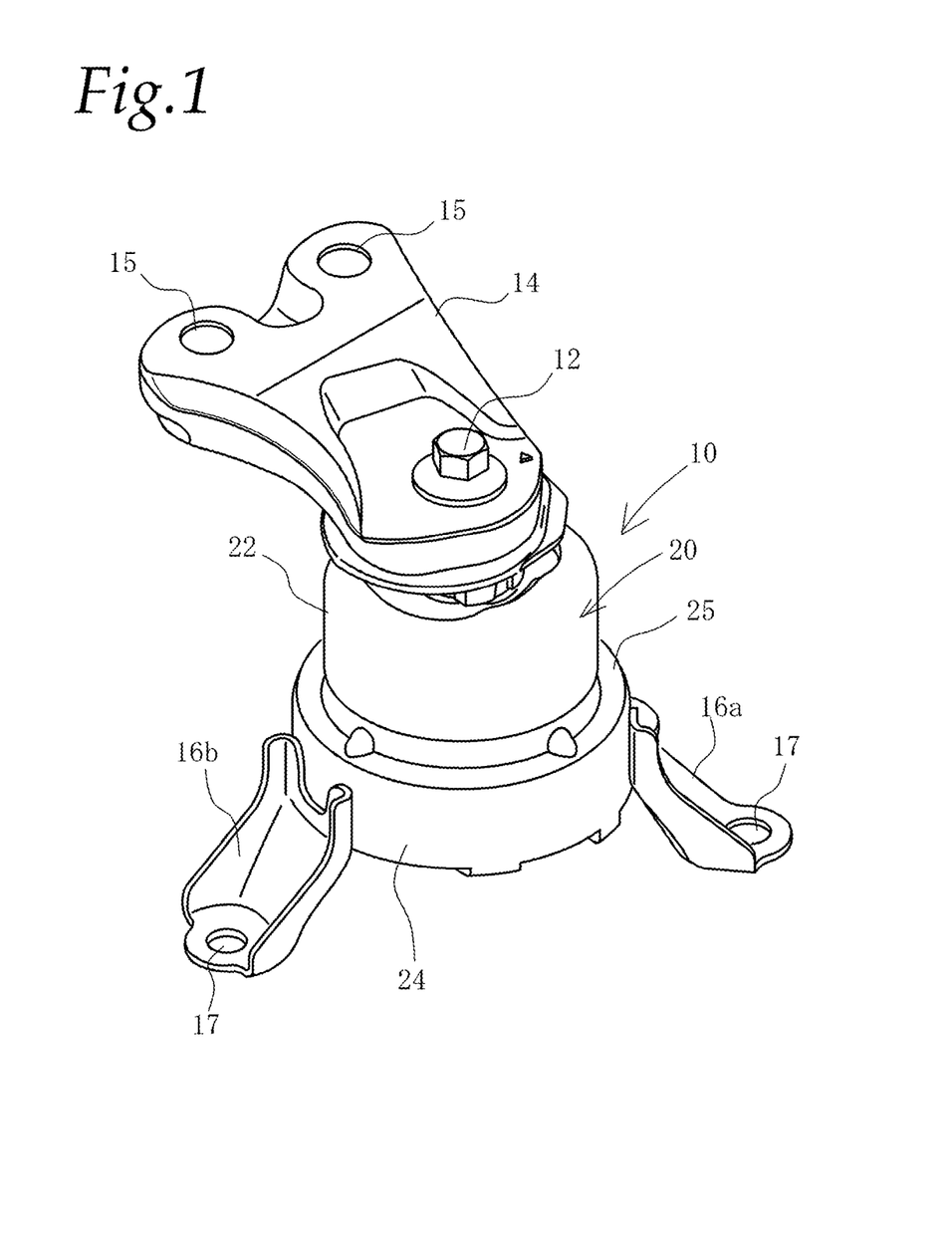
FIG. 1 is a perspective view of a liquid sealed mount in accordance with an embodiment of the present invention.
Figure 2:
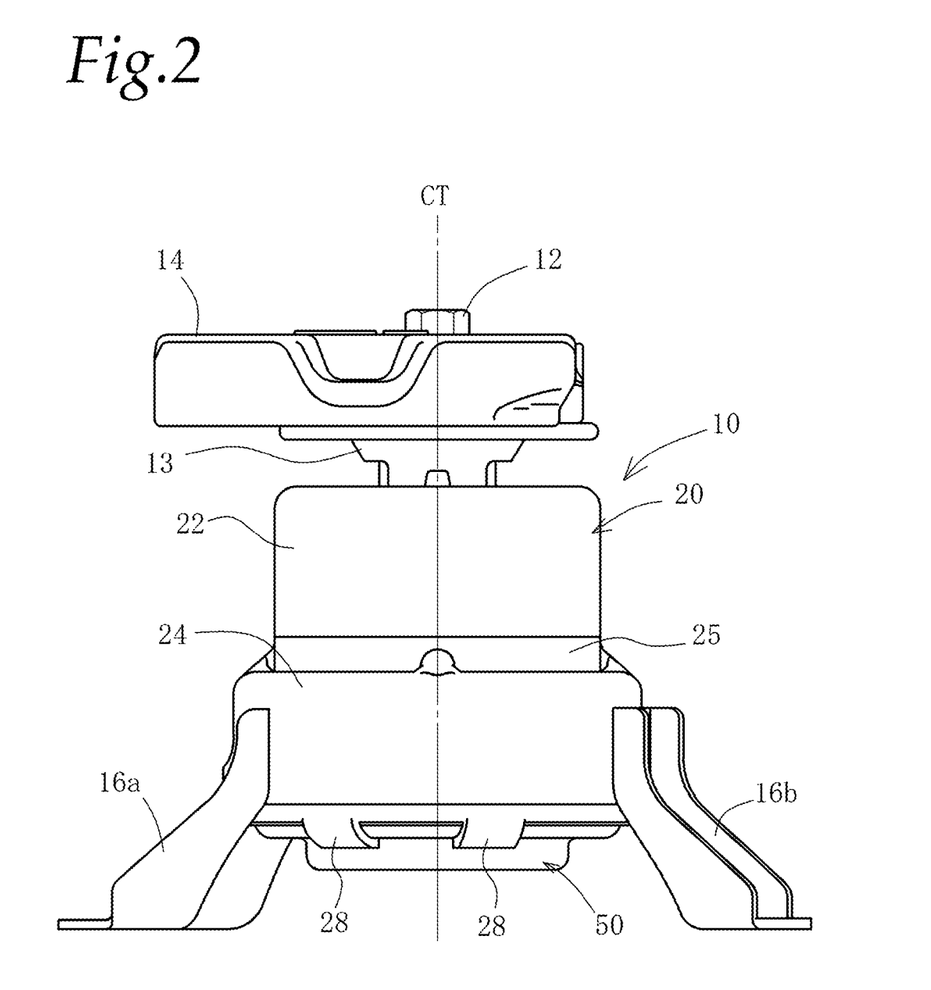
FIG. 2 is a front view of the liquid sealed mount.
Figure 3:
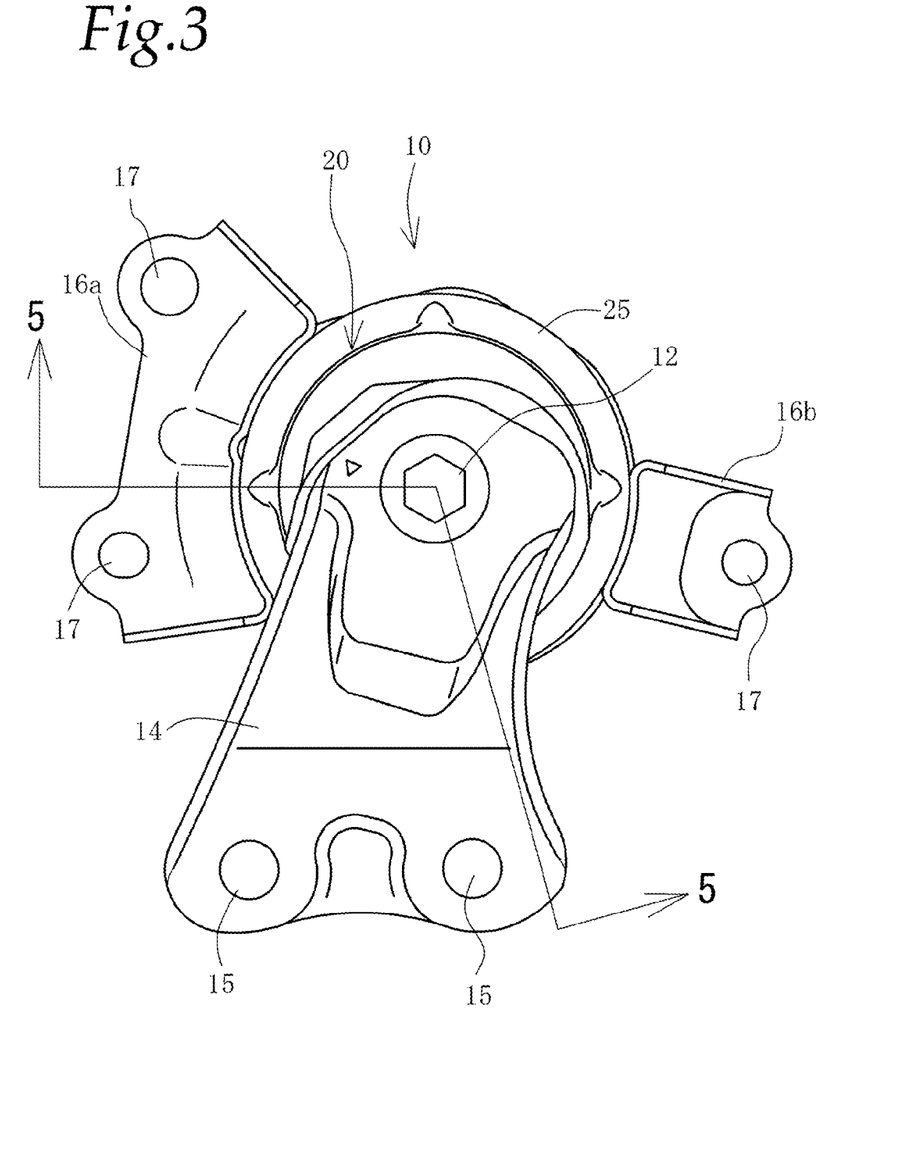
FIG. 3 is a top plan view of the liquid sealed mount.

Referring first to FIGS. 1 through 3, a liquid sealed mount 10 is mounted at an upper part thereof on an engine bracket 14 by a bolt 12 on a mount axis CT. The engine bracket 14 is mounted on an engine by bolts (not shown, respectively) through mounting holes 15 provided in an extension end thereof.

A lower part of the liquid sealed mount 10 is mounted through brackets 16a, 16b of leg shape on a vehicle body which is not shown in the drawing. The mount axis CT is a center axis of the liquid sealed mount 10, and the direction of the mount axis CT is the input direction of a principal vibration to be isolated. The brackets 16a, 16b corresponding to second metal mountings to be mounted on the vehicle body are mounted through mounting holes 17 on the vehicle body by bolts which are not shown in the drawing.

Figure 5:
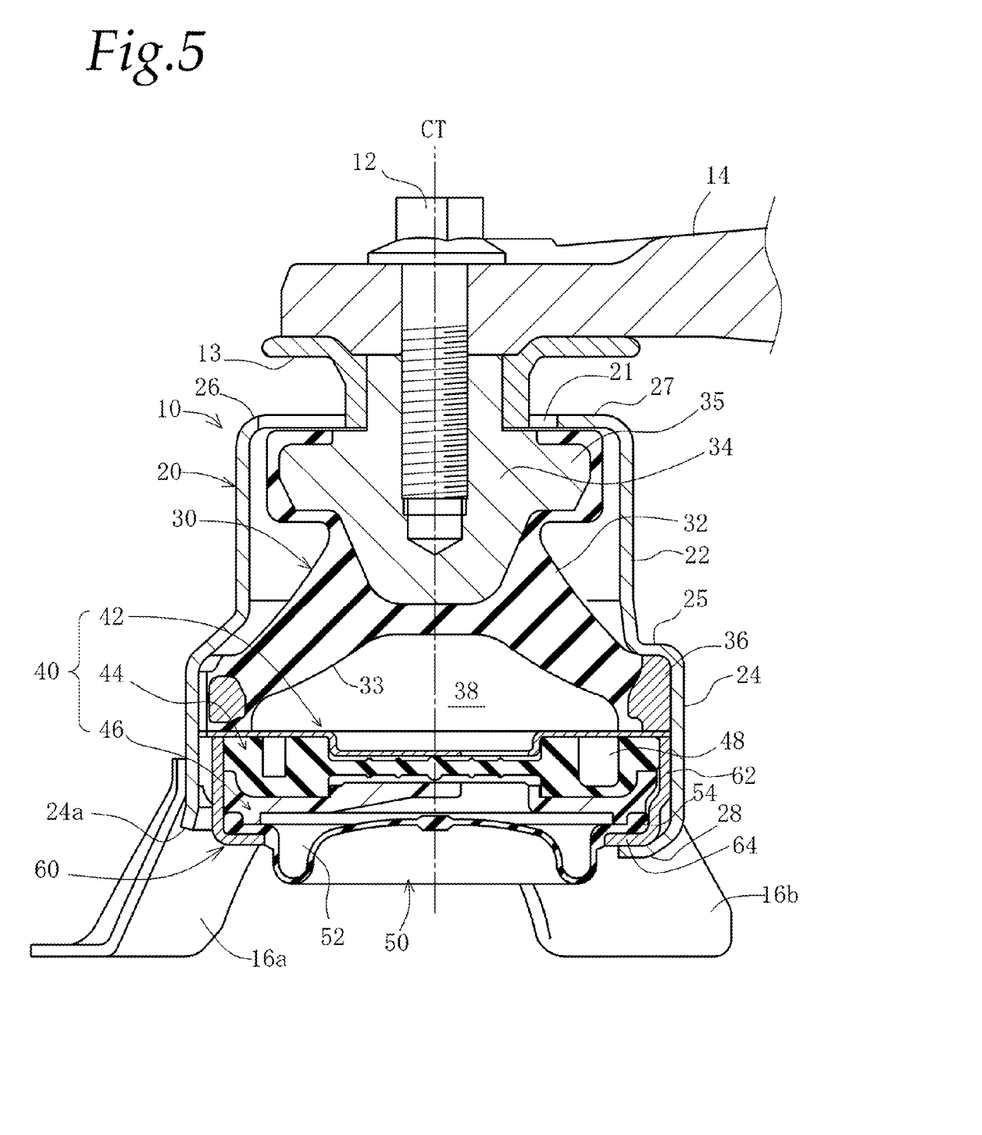
FIG. 5 is a cross sectional view taken on line 5-5 of FIG. 3.

In the present invention, upward and downward directions shall be set on the basis of a condition of FIGS. 2 and 5, and an upper side of the drawing shall be an upper side of the liquid sealed mount 10. Namely, the mount axis CT is arranged to extend in the upward and downward direction, and, with respect to this mount axis CT, the side of a first metal mounting 34 to be referred to later shall be an upper side.

A construction of the liquid sealed mount 10 will be explained hereunder with FIGS. 5 and 6 as the central figure. The liquid sealed mount 10 has a long outer cylinder 20 of a cylindrical shape. An elastic main body member 30, a partition member 40, a diaphragm 50 and a fixing ring 60 are assembled in the outer cylinder 20 and integrally combined together.

The outer cylinder 20 is provided with an upper end opening 21 and a lower end opening 23 at each upper and lower end thereof, and is a metallic cylindrical member which changes in size in two stages in such a way as to be formed of a small diameter section 22 on the upper side and a large diameter section 24 on the lower side.

The small diameter section 22 functions as a stopper, and an upper end portion 26 thereof surrounds the upper end opening 21. A periphery of the upper end portion 26 is bent partially toward a center so as to form a stopper portion 27 of inwardly extending flange shape. The upper end opening 21 is open in the upward and downward direction as an opening portion for allowing the bolt 12 to pass therethrough.

A step portion 25 is formed in a boundary between the small diameter section 22 and the large diameter section 24.

The large diameter section 24 forms a lower part of the outer cylinder 20 to a periphery of which the brackets 16a, 16b are welded and into which a liquid chamber formation unit 18 (FIG. 6) is fitted. The liquid chamber formation unit 18 includes a lower part of the elastic main body member 30, the partition member 40, the diaphragm 50 and the fixing ring 60 and is configured to form a liquid chamber inside the outer cylinder 20. Among those members, the fixing ring 60 does not form directly the liquid chamber. However, this fixing ring 60 is a necessary member for maintaining the liquid chamber essentially by fixing the diaphragm 50 which forms the liquid chamber, and so shall be included in the liquid chamber formation unit 18.

Figure 4:
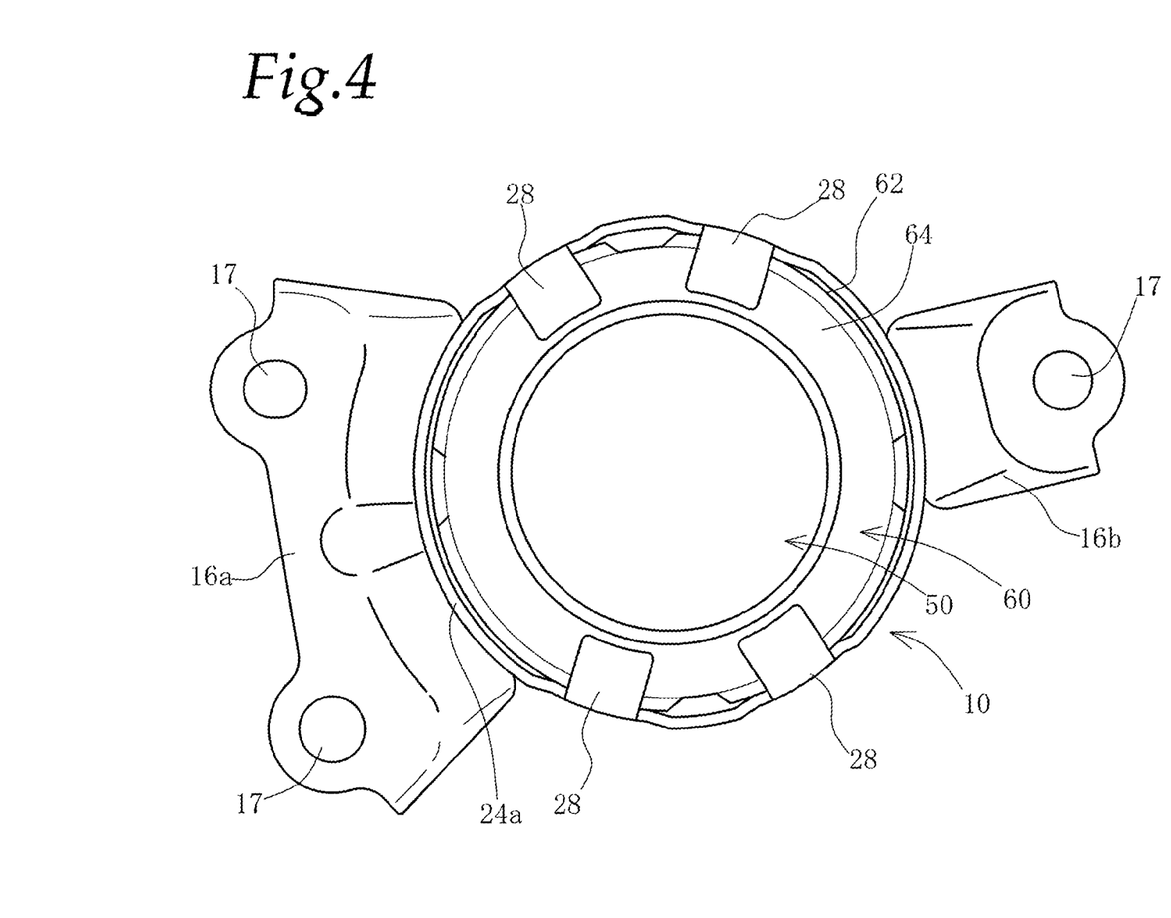
FIG. 4 is a bottom plan view of the liquid sealed mount.

A lower end portion 24a of the large diameter section 24 surrounds the lower end opening 23 which is open upwardly and downwardly. An opening edge portion of the lower end portion 24a is bent slightly outwardly in such a way as to be turned up. A claw 28 is formed in a part of the lower end portion 24a and configured to be bent inwardly at the time of assembling (see FIG. 4).

Figure 7:
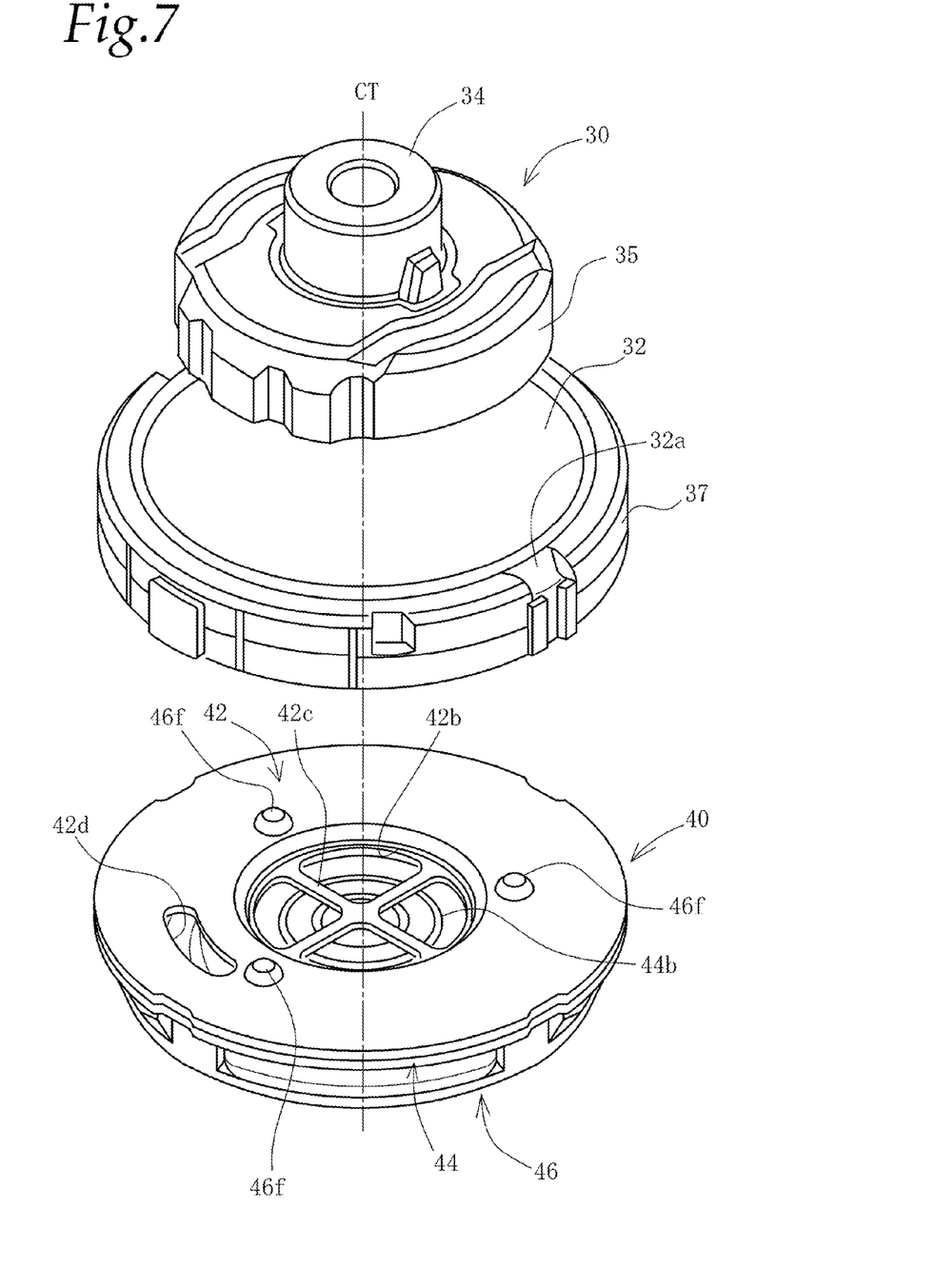
FIG. 7 is an assembly diagram of an elastic main body member and a partition member.

The elastic main body member 30 whose exterior configuration is shown also in FIG. 7, includes an elastic body 32 of substantially truncated cone shape made of rubber or the like, the first metal mounting 34 integrally combined with an upper central part of the elastic body 32, and a ring 36 integrally combined with a lower circumferential part of the elastic body 32.

The inside of the elastic body 32 is formed with a downwardly open liquid chamber concave section 33 into which a hydraulic liquid is filled so as to form a primary liquid chamber 38.

In the first metal mounting 34 there is formed a screw hole against which the bolt 12 is tightened. Moreover, an upper part of the first metal mounting 34 is formed with a radially extending projecting portion 35. The stopper portion 27 overlaps with the radially extending projecting portion 35 to thereby form a stopper at the time of rebound. In addition, at the time of bound, a flange member 13 which is engaged on an upper periphery of the first metal mounting 34 projecting from the upper end opening 21 is configured to make contact with the stopper portion 27.

A circumference of an opening portion of the liquid chamber concave section 33 is reinforced with the ring 36. The ring 36 is integrally combined with a lower end portion 37 of the elastic main body member 30. The lower end portion 37 forms a lower end outer circumferential portion of the elastic body 32 which spreads downwardly in a chevron shape. The ring 36 is integrally embedded in this lower end outer circumferential portion. An outer circumferential surface of the lower end portion 37 extends substantially in parallel with an inner circumferential surface of the large diameter section 24. The lower end portion 37 is press fitted into the inner circumferential surface of the large diameter section 24 and engaged in sealing contact therewith. An upper end part of the lower end portion 37 is formed with a shoulder portion which is continuous with an outer circumferential surface of a chevron shaped portion of the elastic body 32. The shoulder portion makes contact with and is supported by the step portion 25.

Figure 8:
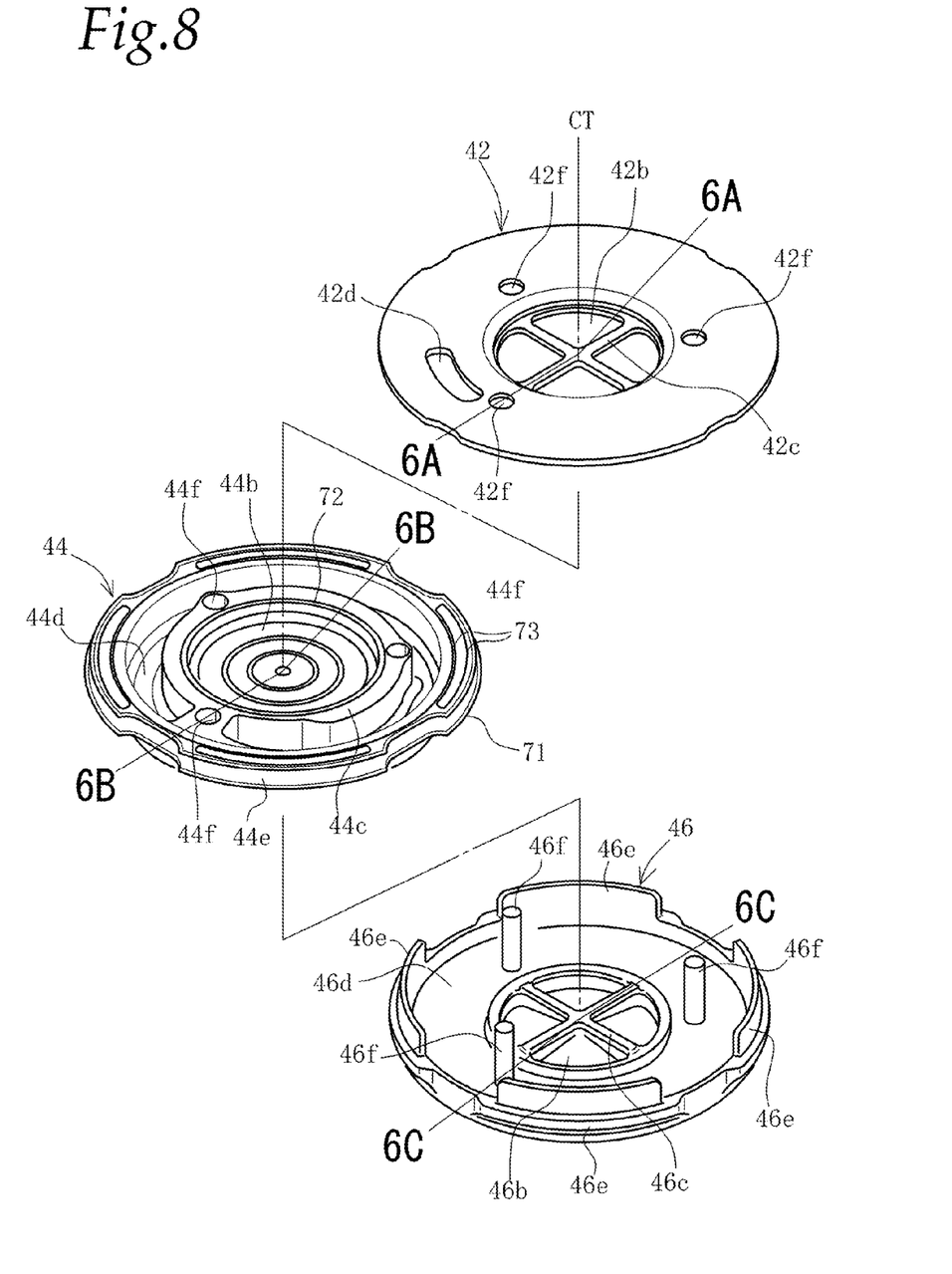
FIG. 8 is an assembly diagram of the partition member.

The partition member 40 is a member for closing the liquid chamber concave section 33 of the elastic main body member 30 and is integrally provided with a lid member 42, an elastic partition member 44 and a lower holder 46, as an exterior configuration view of the integrally combined state thereof is given in FIG. 7, and as an exterior configuration view of each of component members is given in FIG. 8.

An orifice passage 48 is provided in the partition member 40. This orifice passage 48 provides communication between the primary liquid chamber 38 and a secondary liquid chamber 52 formed between the partition member 40 and the diaphragm 50, and is configured to produce liquid column resonance at a predetermined resonance frequency. A detailed structure of the partition member 40 will be referred to later.

The diaphragm 50 covers the secondary liquid chamber 52 at the lower side of the partition member 40 and is deformable in accordance with volume change of the secondary liquid chamber 52 in such a manner that it follows in the wake of the volume change of the secondary liquid chamber 52 which is formed between the diaphragm 50 and the partition member 40. An outer circumferential portion of the diaphragm 50 forms a thick outer circumference fixing section 54. This thick outer circumference fixing section 54 is configured to make contact with a lower surface of the partition member 40 (lower holder 46).

The thick outer circumference fixing section 54 of the diaphragm 50 is fixed by the fixing ring 60. The fixing ring 60 is a metal fitting formed of a cylindrical main body portion 62. A lower end of the fixing ring 60 is formed with a flange portion 64 bent inwardly in an inward flange shape and overlaps as a bottom portion with the thick outer circumference fixing section 54.

Further, the main body portion 62 is press fitted to and fixed in the inside of the large diameter section 24 of the outer cylinder 20, and an upper end of the main body portion 62 is in contact with a lower surface of an outer circumferential portion of the lid member 42. In addition, an outer circumferential surface of the main body portion 62 is in sealing contact with the inner circumferential surface of the large diameter section 24 with exception of a part thereof.

Next, the detailed structure of the partition member will be explained with reference to FIGS. 5 to 8. By the way, with respect to cross sections of each of the component members (42, 44, 46) forming the partition member 40 in FIG. 6, the lid member 42 is taken along line 6A-6A in FIG. 8, the elastic partition member 44 is taken along line 6B-6B, and the lower holder 46 is taken along line 6C-6C.

As shown in FIG. 8, the lid member 42 is made of a rigid member such as metal or the like and formed in the shape of a disc. The outer diameter of the lid member 42 is larger than each of outer diameters of the elastic partition member 44 and the lower holder 46. An opening 42b is provided in a central part of the lid member 42.

In the opening 42b there is provided a deformation restraining member 42c of cross shape. A primary liquid chamber side opening 42d of the orifice passage 48 is formed external to the opening 42b.

The elastic partition member 44 is made of an elastic member such as rubber or the like and formed in the shape of an upwardly open cup. A central part of the elastic partition member 44 is formed with a movable diaphragm portion 44b facing the opening 42b. In the circumference of the movable diaphragm portion 44b there is formed an inner circumferential wall 44c. An orifice groove 44d which constitutes the orifice passage 48 is formed between the inner circumferential wall 44c and the outer circumferential wall 44e.

The lower holder 46 is a rigid member made of resin or the like and is formed in the shape of an upwardly open cup. In a central part of the lower holder 46, an opening 46b is provided in a position located under the movable diaphragm portion 44b. A deformation restraining member 46c of cross shape is provided in this opening 46b.

A ring shaped bottom portion 46d is formed between the opening 46b and the outer circumferential wall 46e and configured to support the bottom portion of the orifice groove 44d. In addition, in the bottom portion 46d there is formed a secondary liquid chamber side opening (not shown in the drawing) for connecting the orifice passage 48 to the secondary liquid chamber 52.

A reference character 46f designates a positioning projection. When the positioning projections 46f pass through positioning holes 44f formed in the inner circumferential wall 44c, and upper ends of the positioning projections 46f are engaged into positioning holes 42f formed in the lid member 42, three members consisting of the lid member 42, the elastic partition member 44 and the lower holder 46 are fixed in position and integrated into a single structural member.

In an integrally combined condition of the partition member 40, the hydraulic liquid within the primary liquid chamber 38 is able to be moved through the opening 42b to the upper side of the movable diaphragm portion 44b, and also the hydraulic liquid within the secondary liquid chamber 52 is able to be moved through the opening 46b to the lower side of the movable diaphragm portion 44b, so that the movable diaphragm portion 44b absorbs the internal pressure fluctuation of the primary liquid chamber 38.

Next, an assembly method of this liquid sealed mount will be explained. First, each of the component members of the partition member 40 in FIG. 8 is placed one another so as to be integrally combined together. The integrally combined state is shown in FIG. 7.

The diaphragm 50 is attached to the lower side of the partition member 40. Then, the fixing ring 60 is fitted on the partition member 40 and the diaphragm 50 from the outside.

As shown in FIG. 5, the partition member 40 and the diaphragm 50 are fitted to and engaged on the inside of the fixing ring 60. The flange portion 64 supports the thick outer circumference fixing section 54 of the diaphragm 50 from below.

The thick outer circumference fixing section 54 of the diaphragm 50, an outer circumferential portion of the lower holder 46 with which the thick outer circumference fixing section 54 makes contact and an outer circumferential portion of the elastic partition member 44 which is fitted to and engaged into the outer circumferential portion of the lower holder 46 are fitted to and engaged on the inside of the main body portion 62 which forms an annular wall. The upper end of the main body portion 62 is in contact with the lower surface of the outer circumferential portion of the lid member 42.

Figure 6:
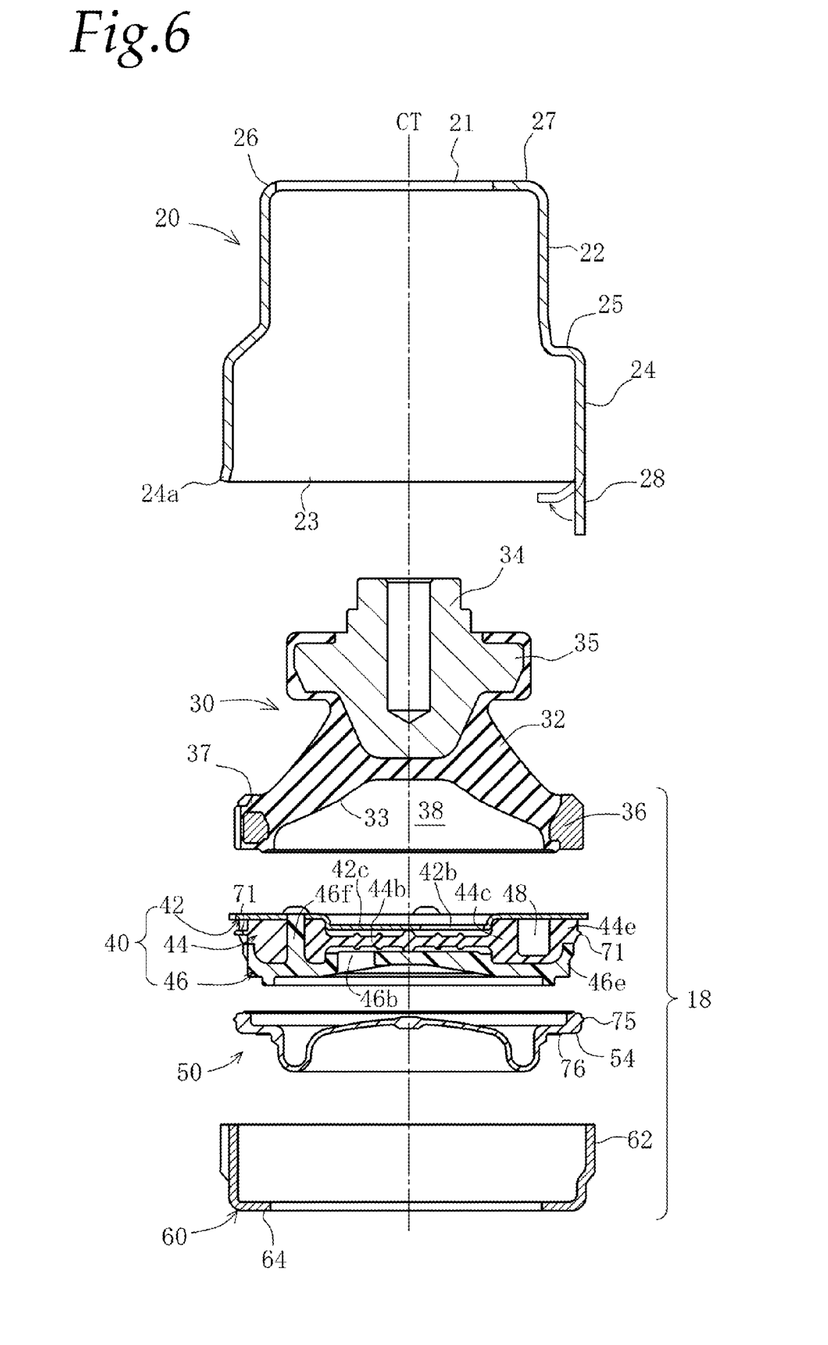
FIG. 6 is an assembly diagram of the whole.

Next, the outer cylinder 20 is turned upside down and arranged in the liquid in such a position that top and bottom are reversed with respect to an illustrated state in FIG. 6. Then, the elastic main body member 30 which is turned upside down is inserted from the first metal mounting 34 side thereof into the outer cylinder 20 through the lower opening 23 of the large diameter section 24 located on the upper side, and a shoulder portion of the lower end portion 37 of the elastic main body member 30 comes into contact with and is supported on the step portion 25.

After that, a sub-assembly integrally formed of the partition member 40, the diaphragm 50 and the fixing ring 60 is press fitted into the inside of the large diameter section 24 from the lower end portion 24a side in a state of the partition member 40 placed at a lower side.

Like this, the fixing ring 60 in which the diaphragm 50 and the partition member 40 are previously fitted or engaged is press fitted into the inside of the large diameter section 24, and the partition member 40 closes the liquid chamber concave section 33.

Moreover, since the fixing ring 60 is press fitted into the inside of the large diameter section 24, the sub-assembly into which the partition member 40, the diaphragm 50 and the fixing ring 60 are integrated is tentatively fastened in place.

After that, the claws 28 provided in the lower end 24a of the large diameter section 24 are bent inwardly thereby to fix the flange portion 64 constituting a bottom portion of the fixing ring 60. Due to fixation by the claws 28, the elastic main body member 30, the partition member 40, the diaphragm 50 and the fixing ring 60 are press fitted into and piled up in the outer cylinder 20 so as to be fluid-tightly integrated into one body between the step portion 25 and the claws 28, whereby it is possible to obtain a sufficiently large pull-out load.

Next, the special seal for adhered liquid will be explained in detail with FIGS. 9 to 12 as the central figures.

Figure 9:
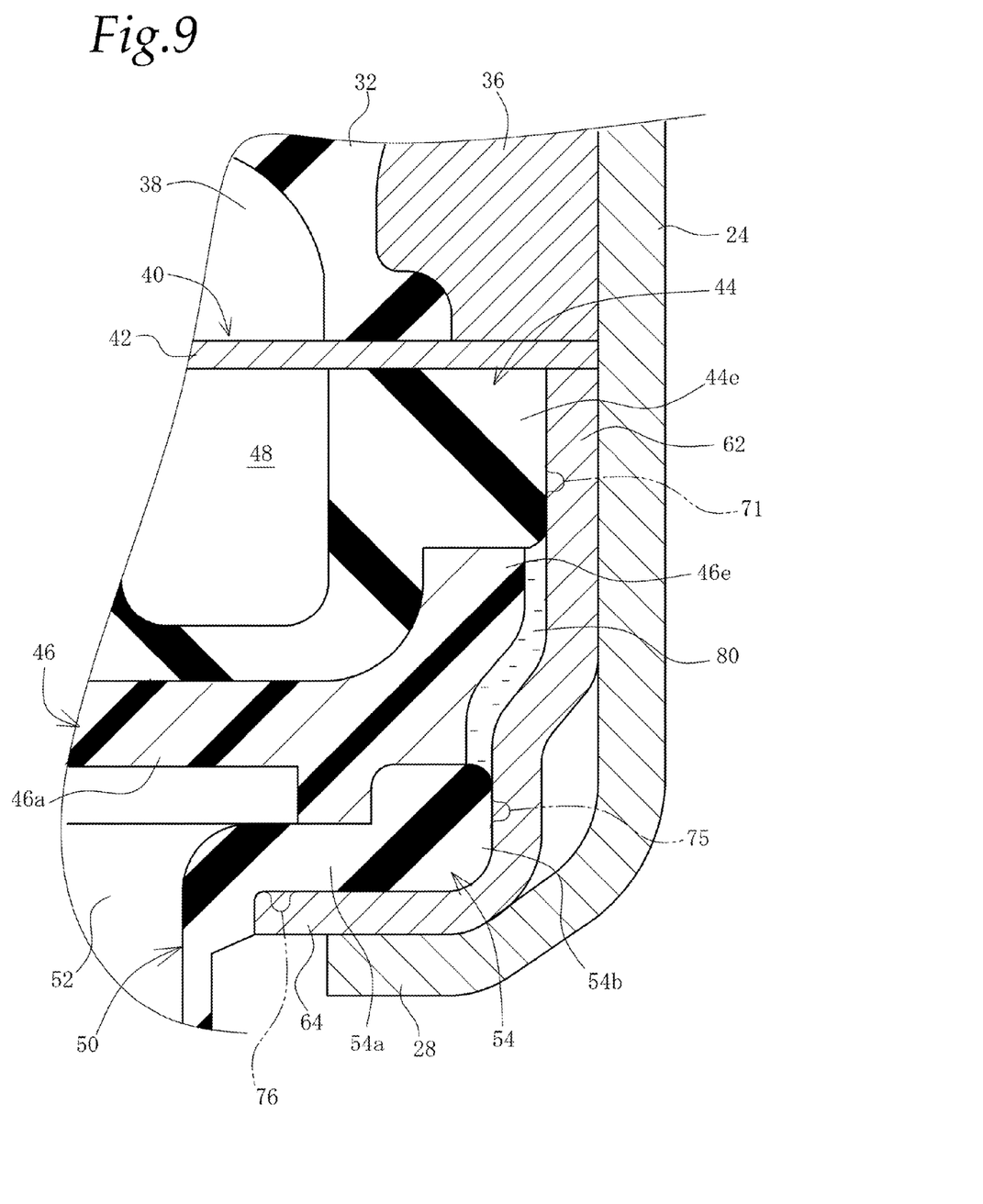
FIG. 9 is an enlarged cross sectional view of a region around a special seal for adhered liquid of FIG. 5.
Figure 10:
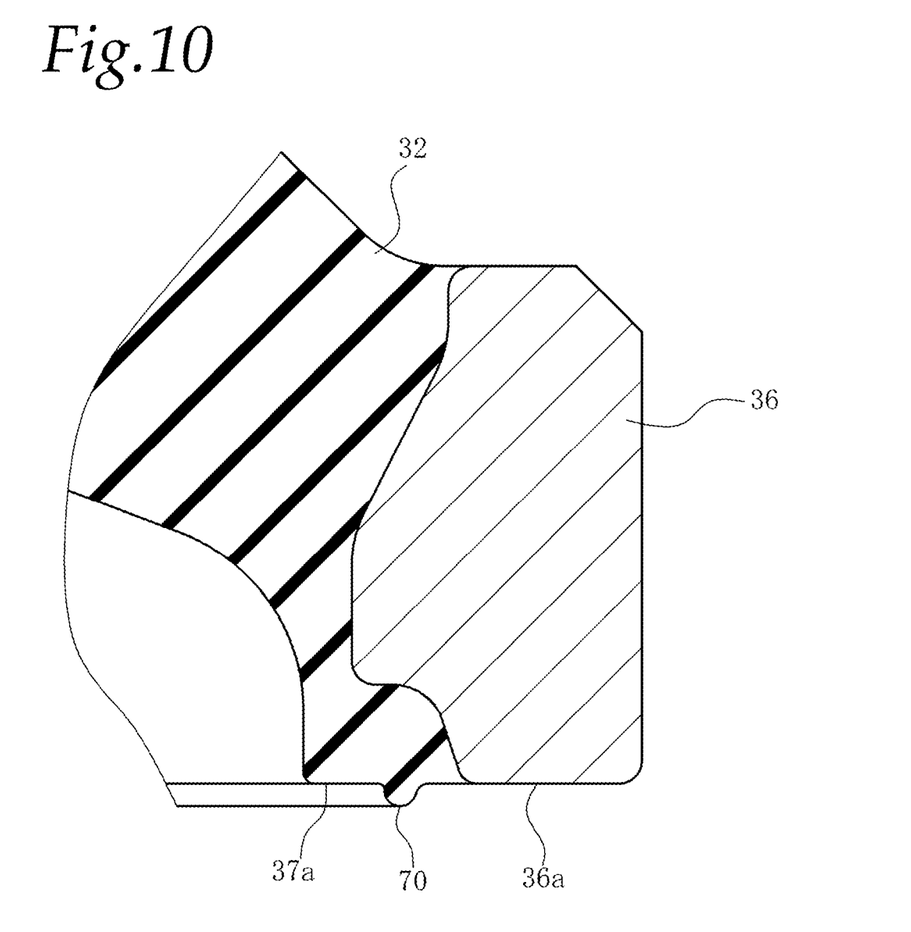
FIG. 10 is an enlarged cross sectional view of a lower seal region of the elastic main body member.
Figure 11:
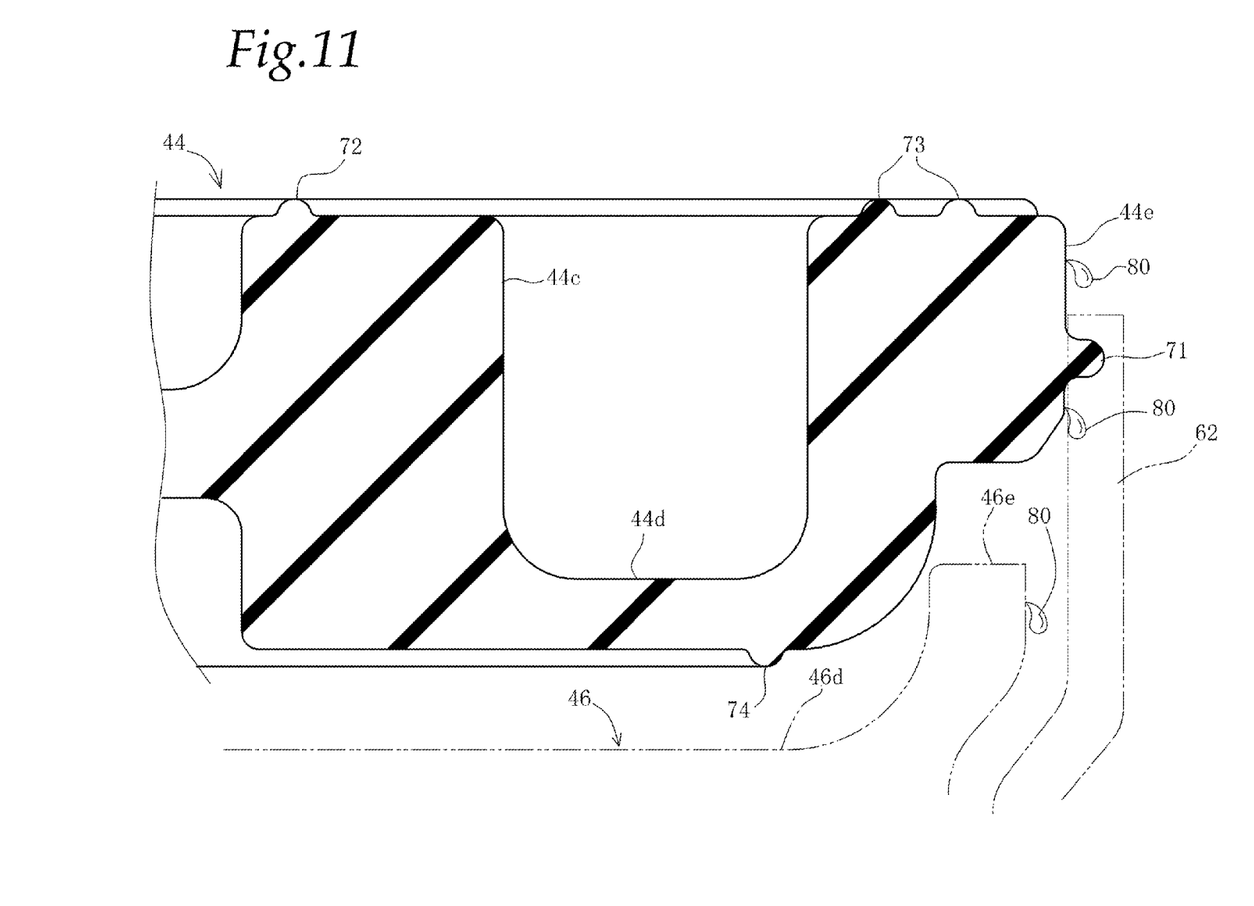
FIG. 11 is an enlarged cross sectional view of a seal region of an elastic partition member.
Figure 12:
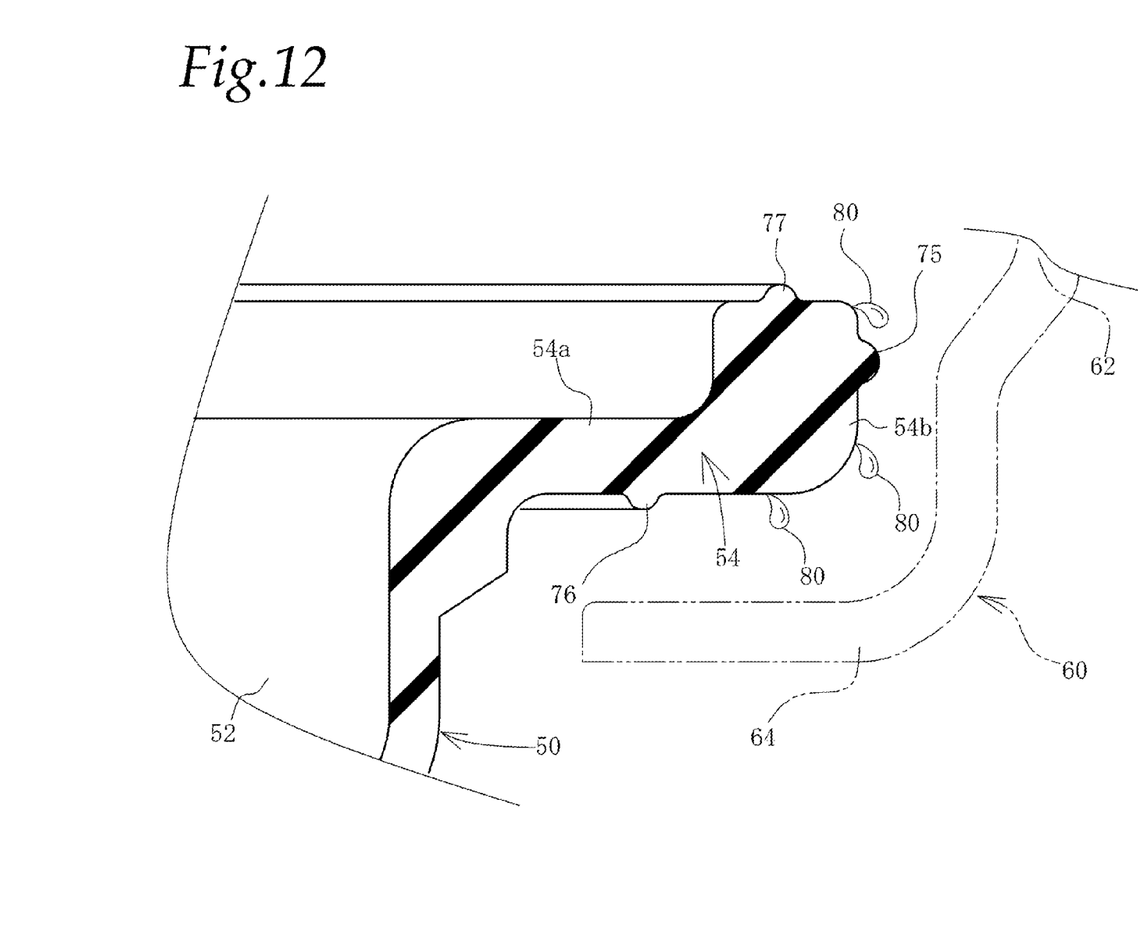
FIG. 12 is an enlarged cross sectional view of a seal region of a diaphragm.

FIG. 9 is a cross sectional view, on an enlarged scale, of a part of FIG. 5 with respect to a seal region. FIG. 10 is a partially enlarged cross sectional view of the lower end portion 37 of the elastic main body member 30. FIG. 11 is a partially enlarged cross sectional view of the elastic partition member 44. FIG. 12 is a partially enlarged cross sectional view of the thick outer circumference fixing section 54 of the diaphragm 50.

In FIG. 9, an adhered liquid leak preventing structure is provided between each outer circumferential portion of the partition member 40 and the diaphragm 50 and the fixing ring 60. At the time of assembling this liquid seal mount 10 in the liquid, an adhered liquid 80 which adheres on each of the outer circumferential portions of the partition member 40 and the diaphragm 50 and is trapped between these outer circumferential portions and the fixing ring 60 leaks out onto a surface of the product after assembly whereby the adhered liquid is formed. The seal of the adhered liquid is performed by a first special seal 71 for adhered liquid, a second special seal 75 of adhered liquid and a third special seal 76 for adhered liquid.

Next, seal structures of each of the regions in relation to the adhered liquid leak preventing structure will be explained hereunder.

FIG. 10 shows a seal region of the lower end portion 37 of the elastic main body member 30. The ring 36 is formed integral with an outer circumferential side of the lower end portion 37. A lower end surface 37a of the lower end portion 37 and a lower end surface 36a of the ring 36 are flush with each other and make contact with a surface of an outer circumferential region of the lid member 42.

A first main seal 70 which projects downwardly is integrally formed on the lower end surface 37a of the lower end portion 37. The first main seal 70 is an annular seal which is continuous with and formed integral with the lower end portion 37, and surrounds a circumference of an opening portion of the first liquid chamber 38. When the first main seal 70 makes sealing contact with the outer circumferential surface of the lid member 42, the first liquid chamber 38 is sealed.

FIG. 11 is the seal structure of the elastic partition member 44. On an upper portion of an outer circumferential surface of an outer circumferential wall 44e of the elastic partition member 44, there is provided the first special seal 71 for adhered liquid which projects outwardly in the radial direction. The first special seal 71 for adhered liquid makes sealing contact with an inner circumferential surface of the main body portion 62 and prevents the adhered liquid 80 from leaking out from between the outer circumferential wall 44e and the main body portion 62 to between the ring 36 and the large diameter section 24.

On each of upper end surfaces of the inner circumferential wall 44c and the outer circumferential wall 44e of the elastic partition member 44, there are provided second and third main seals 72, 73 which project upwardly. The second main seal 72 and the third main seals 73 surround the orifice groove 44d and are formed in an annular shape on inner and outer circumferential sides of the orifice groove 44d. Each of the second and third main seals 72, 73 makes sealing contact with a lower surface of the lid member 42 and prevents the liquid from leaking out from the orifice groove 44d.

A fourth downwardly projecting main seal 74 is provided in an outer circumferential region of a bottom of the orifice groove 44d. The fourth main seal 74 makes contact with an upper surface of the bottom portion 46d of the lower holder 46 and prevents the hydraulic liquid between an opening (not shown) on the secondary liquid chamber side of the orifice groove 44d and the bottom portion 46d from leaking out.

FIG. 12 shows the seal structure of the thick outer circumference fixing section 54 of the diaphragm 50. The thick outer circumference fixing section 54 is integrally formed with an inner circumferential portion 54a which extends substantially horizontally and an outer circumferential enlarged portion 54b which is continuous with an outer circumferential side of the inner circumferential portion 54a and extends upwardly. The second special seal 75 for adhered liquid which projects outwardly in the radial direction is formed in an annular shape on an outer circumference of the outer circumferential enlarged portion 54b.

The second special seal 75 for adhered liquid makes sealing contact with the inner circumferential surface of the main body portion 62 of the fixing ring 60 and prevents the adhered liquid 80 between each outer circumferential surface of the outer circumferential wall 44e and the outer circumferential enlarged portion 54b and the inner circumferential surface of the main body portion 62 from leaking out downwardly.

Also on a lower surface of the inner circumferential portion 54a there is formed the third special seal 76 for adhered liquid which is formed in an annular shape in a downwardly projecting fashion. This seal makes sealing contact with the upper surface of the flange portion 64 and prevents the adhered liquid 80 between each of the inner circumferential portion 54a and the outer circumferential enlarged portion 54b and each of the inner circumferential surface of the main body portion 62 and the upper surface of the flange portion 64 from leaking outwardly from between the diaphragm 50 and the fixing ring 60.

In addition, a sixth main seal 77 which projects upwardly is formed in annular shape on an upper surface of the outer circumferential enlarged portion 54b and makes sealing contact with a back surface of the bottom portion 46d (see FIG. 11) so as to provide a seal between the back surface of the bottom portion 46d and the upper end surface of the outer circumferential enlarged portion 54b in such a manner that the hydraulic liquid in the secondary liquid chamber 52 does not leak out.

Like this, with provision of the first special seal 71 for adhered liquid, the second special seal 75 for adhered liquid and the third special seal 76 for adhered liquid, even if the adhered liquid 80 adheres onto the outer circumferential surfaces of the partition member 40 and the diaphragm 50 at the time of assembly in the liquid, the leak of the adhered liquid 80 can be prevented and sealed.

Therefore, since there is no liquid leak due to the leak of the adhered liquid 80 after the product has been assembled, it is possible to improve the quality of the product.

Further, the first special seal 71 for adhered liquid and the second special seal 75 for adhered liquid each project outwardly in the radial direction. Therefore, even if the partition member 40 and the diaphragm 50 have moved in the direction orthogonal to the center axis CT, it is possible to keep the sealing contact of the fixing ring 60 with the main body portion 62 whereby to maintain the sealing performance.

Further, by utilizing the elasticity of the elastic partition member 44 which constitutes the partition member 40, the first special seal 71 for adhered liquid can be integrally provided on the outer circumferential wall 44e of the elastic partition member 44.

Further, since the second special seal 75 for adhered liquid is integrally provided in the thick outer circumference fixing section 54 of the diaphragm 50, the second special seal 75 for adhered liquid can be easily formed by utilizing the elasticity of the diaphragm 50.

Furthermore, since the thick outer circumference fixing section 54 is integrally formed with the third special seal 76 for adhered liquid which projects in the direction of the center axis, the third special seal 76 for adhered liquid can be easily formed by utilizing the elasticity of the diaphragm 50, and it is possible to provide a seal between the thick outer circumference fixing section 54 and the flange portion 64 of the fixing ring 60 in the direction of the center axis.

Further, the thick outer circumference fixing section 54 is supported in contacting relation on the flange portion 64 which is a part of the fixing ring 60, and the first through third special seals 71, 75, 76 for adhered liquid are configured to provide a seal between each of the partition member 40 and the thick outer circumference fixing section 54 and the fixing ring 60. Therefore, even in the case where the diaphragm 50 is supported through the intermediary of the fixing ring 60, the leak of the adhered liquid can be prevented and sealed accurately.

Further, the fixing ring 60 is fixed by the claw 28 of the outer cylinder 20. Therefore, the fixation can be performed accurately without an increase in size and weight of the diaphragm in comparison with the case where a mounting member is formed integral with the circumference of the diaphragm 50. In addition, the pull-out load of the elastic main body member 30, the partition member 40, the diaphragm 50 and the fixing ring 60 can be increased whereby to improve reliability.

The present invention is not limited to the above described embodiment, and various modifications and variations may be made within the spirit and scope of the invention. For example, the fixing ring 60 may be omitted. In this case, a ring made of metal, etc. is integrally provided in the outer circumferential portion of the diaphragm 50 and fixed by the claw 28 of the outer cylinder 20.

Further, a cup-shaped member (similar to the fixing ring 60) may be integrally provided in the outer circumferential portion of the diaphragm 50, and a circumferential wall of this cup-shape member may be press fitted into the inside of the large diameter section 24 of the outer cylinder 20 such that all the components are integrated into a single structural member. Then, depending upon the required pull-out load, the fixation of the claw 28 may be used or unused.

The outer circumferential portion of the diaphragm may be extended in a cylindrical shape in the direction of the center axis CT so as to cover the outer circumferential portion of the partition member 40, and the special seal for adhered liquid may be formed on an outer circumference of the cylindrical portion of the diaphragm. In this case, the special seal for adhered liquid on the outer circumferential side of the partition member is omitted. The partition member itself may be formed of a simple structure such as a plate shape and the like.

What is claimed is:

1. A liquid sealed mount comprising:
   an elastic main body member,
   a diaphragm,
   a liquid chamber formed between the elastic main body member and the diaphragm,
   a partition member for partitioning the liquid chamber into a primary liquid chamber and a secondary liquid chamber, the partition member including an elastic partition member of an elastic member,
   the diaphragm including a thick outer circumference fixing section supported by an exterior covering member, which comprises an outer cylinder or a member integrally combined with an inside of the outer cylinder and which covers each exterior of the partition member and the diaphragm,
   the elastic main body member, the partition member, and the diaphragm being piled up in the outer cylinder so as to form a liquid chamber formation unit, which is integrated by fixing the thick outer circumference fixing section by an end of the outer cylinder,
   a contact surface for trapping an adhered liquid adhering on the partition member and the diaphragm at the time of assembly, said contact surface being formed between the exterior covering member and each outer circumferential portion of the partition member and the thick outer circumference fixing section when the liquid chamber formation unit is housed in the outer cylinder,
   an outer circumferential wall of the elastic partition member and an outer circumferential portion of the thick outer circumferential fixing section being configured to make contact with the exterior covering member in a region of the contact surface,
   a main seal, which projects in the direction of a center axis and annularly surrounds the liquid chamber so as to prevent hydraulic liquid from leaking out, being provided on a joining surface between the partition member and each of the elastic main body member and the diaphragm of the liquid chamber formation unit, and
   a special seal for adhered liquid, which seals the joining surface so as to prevent the adhered liquid from leaking out, being provided in addition to the main seal, the special seal for adhered liquid being configured to project toward the exterior covering member and at least in the thick outer circumference fixing section of the diaphragm.

2. The liquid sealed mount according to claim 1, wherein a first special seal for adhered liquid, which forms part of the special seal for adhered liquid, is integrally provided on an outer circumferential wall of the elastic partition member.

3. The liquid sealed mount according to claim 2, wherein the special seal for adhered liquid includes a radially outwardly projecting member.

4. The liquid sealed mount according to claim 2, wherein a second special seal for adhered liquid, which forms part of the special seal for adhered liquid, projects radially outwardly and is integrally provided in the thick outer circumference fixing section.

5. The liquid sealed mount according to claim 4, wherein the thick outer circumference fixing section is integrally formed with a third special seal for adhered liquid, which projects in the direction of the center axis so as to form one of the special seal for adhered liquid.

6. The liquid sealed mount according to claim 1, wherein the special seal for adhered liquid includes a radially outwardly projecting member.

7. The liquid sealed mount according to claim 6, wherein a second special seal for adhered liquid, which forms part of the special seal for adhered liquid, projects radially outwardly and is integrally provided in the thick outer circumference fixing section.

8. The liquid sealed mount according to claim 7, wherein the thick outer circumference fixing section is integrally formed with a third special seal for adhered liquid, which projects in the direction of the center axis so as to form part of the special seal for adhered liquid.

9. The liquid sealed mount according to claim 1, wherein a second special seal for adhered liquid, which forms part of the special seal for adhered liquid and projects radially outwardly, is integrally provided in the thick outer circumference fixing section.

10. The liquid sealed mount according to claim 9, wherein the thick outer circumference fixing section is integrally formed with a third special seal for adhered liquid, which projects in the direction of the center axis so as to form part of the special seal for adhered liquid.

11. The liquid sealed mount according to claim 10, wherein the exterior covering member integrally combined with the inside of the outer cylinder is a fixing ring configured to be inserted into the inside of the outer cylinder, wherein the thick outer circumference fixing section is supported on a part of the fixing ring in contacting relation, and the special seal for adhered liquid is configured to provide a seal between the fixing ring and each of the partition member and the thick outer circumference fixing section.

12. The liquid sealed mount according to claim 11, wherein the fixing ring is fixed by a claw of the outer cylinder.

13. The liquid sealed mount according to claim 9, wherein the exterior covering member integrally combined with the inside of the outer cylinder is a fixing ring configured to be inserted into the inside of the outer cylinder, wherein the thick outer circumference fixing section is supported on a part of the fixing ring in contacting relation, and the special seal for adhered liquid is configured to provide a seal between the fixing ring and each of the partition member and the thick outer circumference fixing section.

14. The liquid sealed mount according to claim 13, wherein the fixing ring is fixed by a claw of the outer cylinder.

\* \* \* \* \*